United States Patent
Kita

[11] Patent Number: 6,046,551
[45] Date of Patent: Apr. 4, 2000

[54] DEVICE FOR CONTROLLING LIGHTING OF DISCHARGE LAMP AND H-BRIDGE CIRCUIT FOR USE IN SUCH A DEVICE

[75] Inventor: Masahide Kita, Tokyo, Japan

[73] Assignee: Mitsubishi Denki Kabushiki Kaisha, Tokyo, Japan

[21] Appl. No.: 09/195,538

[22] Filed: Nov. 19, 1998

[30] Foreign Application Priority Data

Feb. 25, 1998 [JP] Japan .................................. 10-043995
Aug. 7, 1998 [JP] Japan .................................. 10-224697
Oct. 29, 1998 [JP] Japan .................................. 10-309066

[51] Int. Cl.$^7$ ................................................ H05B 37/02
[52] U.S. Cl. ......................... 315/307; 315/291; 315/309; 363/13; 363/98
[58] Field of Search ...................... 315/307, 291, 315/224, 219, 209 R, 308, 309, DIG. 5; 363/13, 15, 16, 17, 98, 132

[56] References Cited

U.S. PATENT DOCUMENTS

| | | | |
|---|---|---|---|
| 5,434,474 | 7/1995 | Ukita et al. .............................. | 315/128 |
| 5,481,163 | 1/1996 | Nakamura et al. ...................... | 315/308 |
| 5,486,740 | 1/1996 | Yamashita et al. ...................... | 315/308 |
| 5,705,897 | 1/1998 | Hanazaki et al. ........................ | 315/307 |
| 5,910,712 | 6/1999 | Toyama .................................... | 315/307 |

FOREIGN PATENT DOCUMENTS 4-26002  2/1992  Japan .
7169582  7/1995  Japan .

*Primary Examiner*—Haissa Philogene
*Assistant Examiner*—Tuyet Vo

[57] ABSTRACT

A discharge lamp lighting control device comprises an H-bridge circuit connected between the secondary coil of a transformer and a discharge lamp and provided with a first pair of transistors and a second pair of transistors, capable of converting a DC voltage produced from an AC voltage that appears at the secondary coil of the transformer into an AC voltage whose polarity is changed at predetermined intervals so as to apply the AC voltage to the discharge lamp. The first pair of transistors have withstand voltage characteristic superior to that of the second pair of transistors. The on-state resistances of the four transistors of the first and second pairs can be equal to each other so that the difference between the on-state resistances may be ignored. A control unit turns on only the first pair of transistors when applying a high voltage to the discharge lamp to cause a discharge to pass through the gas contained in the discharge lamp. The control unit can estimate an on-state resistance of the first and second pair of transistors and also predict an AC voltage actually applied to the discharge lamp from the estimated on-state resistance to control a voltage applied to the primary coil of the transformer so that a predetermined power is supplied to the discharge lamp.

8 Claims, 4 Drawing Sheets

DEVICE FOR CONTROLLING LIGHTING OF DISCHARGE LAMP AND H-BRIDGE CIRCUIT FOR USE IN SUCH A DEVICE

BACKGROUND OF THE INVENTION

1. Field of the Invention

The present invention relates to a discharge lamp lighting control device for controlling the lighting of a discharge lamp that emits light through a discharge caused by a breakdown. More particularly, it relates to a discharge lamp lighting control device suitable for controlling the lighting of a discharge lamp intended for a headlight mounted in a vehicle such as an automobile, and an H-bridge circuit for use in such a discharge lamp lighting control device.

2. Description of the Prior Art

Conventionally, halogen lamps, in which a halogen gas is contained into an electrode tube, have become into widespread usage as automobile headlights. Halogen lamps provide an advantage that they can emit a higher light flux compared with filament bulbs. However, attempts have been made to make use of discharge lamps, such as high-voltage sodium lamps or metal halide lamps, which have been used as street lamps, as automobile headlights, instead of halogen lamps.

Referring next to FIG. 5, there is illustrated a block diagram showing a prior art discharge lamp lighting control device as disclosed in Japanese Patent Application Laying Open (KOKAI) No. 4-26002. In the figure, reference numeral 1 denotes a DC power supply, such as a battery, which can be mounted on an automobile, 2 denotes a DC/DC converter which converts the power supply voltage from the DC power supply 1 into a higher predetermined voltage, 3 denotes DC/AC inverter which converts the predetermined voltage from the DC/DC converter into an AC voltage, 4 denotes a discharge lamp, 5 denotes an igniter circuit connected between the DC/AC inverter 3 and the discharge lamp 4, for generating and applying an extra-high voltage to the discharge lamp when supplying the power to the discharge lamp by further raising the AC voltage from the DC/AC inverter 3, and 6 denotes a control circuit for controlling the DC/DC converter 2 so that the discharge lamp lighting control device supplies a constant power to the discharge lamp 4.

Furthermore, reference numeral 8 denotes a transformer having its primary coil electrically connected to the DC power supply 1 and its secondary coil electrically connected to the discharge lamp 4, for generating, at the secondary coil, a voltage which is higher than that applied to the primary coil, 9 denotes a switch connected, in series to the DC power supply 1, between the primary coil of the transformer 8 and the DC power supply 1, 10 denotes a resistor, which is disposed as a voltmeter, for measuring the DC voltage that appears at the secondary coil of the transformer 8 as the lamp voltage, 11 to 14 denote transistors connected between the transformer 8 and the igniter circuit 5, and 22 denotes a switching control circuit for performing an on/off control operation on the four transistors. The four transistors 11 to 14 make up an H-bridge circuit.

While the discharge lamp 4 does not light up, the two electrodes of the discharge lamp 4 are insulated from each other. When a lighting setup process of causing an arc discharge within the discharge lamp 4 is started in the insulated state, the control circuits 6 operates in such a manner that a high voltage of about 400 Volts appears at the secondary coil of the transformer 8 within the DC/DC converter 2. The switching control circuit 22 controls the H-bridge circuit so that the high voltage is supplied to the igniter circuit 5, just as it is. The igniter circuit 5 raises the high voltage up to a higher voltage of about 20 kV. When the high voltage of about 20 kV is applied to the discharge lamp 4, an arc discharge is caused to pass through the gas between the electrodes of the discharge lamp by a breakdown. The discharge lamp 4 then starts emitting light.

When such a breakdown is caused within the discharge lamp, the igniter circuit 5 stops the ignition operation and the DC/AC inverter 3 starts the switching operation. Accompanied by the breakdown, the voltage that appears at the secondary coil of the transformer 8 is reduced to a voltage dependent upon the rated voltage of the discharge lamp 4. The control circuit 6 then changes its control operation so that the discharge lamp lighting control device supplies a constant power to the discharge lamp 4. An AC voltage controlled to have a constant power is thus applied to the discharge lamp 4, and the discharge lamp 4 continues to emit light.

Controlling the lighting of the discharge lamp 4 with a constant power supply is intended for increasing the lifetime of the discharge lamp 4 from the viewpoint of the characteristics of the discharge lamp 4.

Conventionally, the four transistors 11 to 14 included in the H-bridge circuit are transistors with the high withstand-voltage characteristic of about 400 Volts. Accordingly, a problem with the prior art discharge lamp lighting control circuit is that the four transistors require a large space because heat radiation from the transistors must be considered and the large space occupied by the four transistors therefore prevents the downsizing of the H-bridge circuit and hence the device.

Especially, since the control circuit 6 measures the DC voltage that appears at the secondary coil of the transformer 8 by means of the resistor 10 and then controls the DC/DC converter 2 according to the measured DC voltage, the four transistors 11 to 14 that make up the H-bridge circuit should have identical characteristics. If they do not have identical characteristics, an AC voltage generated by the H-bridge might become unstable even though the DC voltage applied to the H-bridge circuit is controlled to remain constant. Therefore, four large-size transistors with the high withstand-voltage identical characteristic of about 400 Volts are employed as the transistors 11 to 14 in the prior art H-bridge circuit.

Another problem with the prior art discharge lamp lighting control device is that if the high voltage applied to the discharge lamp 4 becomes unstable, the discharge lamp 4 is brought into an unstable lighting state in which it cannot emit light having a constant luminous energy with stability.

SUMMARY OF THE INVENTION

The present invention is made to overcome the above problems. It is therefore an object of the present invention to provide an H-bridge circuit whose physical size is reduced, and a discharge lamp lighting control device including such an H-bridge circuit, capable of making a discharge lamp emit light with stability.

In accordance with one aspect of the present invention, there is provided a discharge lamp lighting control device for applying a high voltage to a discharge lamp to cause a discharge to pass through a gas contained in the discharge lamp and for applying an AC voltage to the discharge lamp so as to control the lighting of the discharge lamp, the device comprising: a transformer having a primary coil electrically connected to a DC power supply and a secondary coil electrically connected to the discharge lamp, for generating an AC voltage at the secondary coil thereof which is higher than a DC voltage applied to the primary coil thereof; a switching element connected, in series to the DC power supply, between the primary coil of the transformer and the DC power supply; an H-bridge circuit connected between the secondary coil of the transformer and the discharge lamp and provided with a first pair of transistors and a second pair of transistors, capable of converting a DC voltage produced from the AC voltage that appears at the secondary coil of the transformer into an AC voltage whose polarity is changed at predetermined intervals, the first pair of transistors having withstand voltage characteristic superior to that of the second pair of transistors, and the on-state resistances of the four transistors of the first and second pairs being equal to each other so that the difference between the on-state resistances may be ignored; a voltage measuring unit for measuring the DC voltage applied to the H-bridge circuit; and a control unit for turning on only the first pair of transistors when applying a high voltage to the discharge lamp to cause a discharge to pass through the gas contained in the discharge lamp, and for performing an on/off control operation on the switching element according to the measured DC voltage and alternately turning on the first and second pairs of transistors to apply the AC voltage to the discharge lamp after the discharge lamp has been ignited so that a power supplied to the discharge lamp is stabilized.

The device can further comprise a current measuring element for measuring a current flowing through the discharge lamp. The control unit can estimate an on-state resistance of the first and second pair of transistors and also predicts an AC voltage actually applied to the discharge lamp from the measured current and DC voltage and the estimated on-state resistance to perform an on/off control operation on the switching element so that a predetermined power is supplied to the discharge lamp.

In accordance with a preferred embodiment of the present invention, the control unit includes a temperature measuring element for measuring an ambient temperature in the vicinity of the H-bridge circuit and a memory for storing an on-state resistance table representing a one-to-one correspondence between ambient temperatures and on-state resistances for the first and second pairs of transistors. The control unit can estimate the on-state resistance of the first and second pair of transistors by retrieving an on-state resistance corresponding to the measured ambient temperature from the on-state resistance table.

In accordance with another aspect of the present invention, there is provided a discharge lamp lighting control device for applying a high voltage to a discharge lamp to cause a discharge to pass through a gas contained in the discharge lamp and for applying an AC voltage to the discharge lamp so as to make the discharge lamp emit light, the device comprising: a transformer having a primary coil connected to a DC power supply and a secondary coil electrically connected to the discharge lamp, for generating an AC voltage at the secondary coil thereof which is higher than a DC voltage applied to the primary coil thereof; a switching element connected, in series to the DC power supply, between the primary coil of the transformer and the DC power supply; an H-bridge circuit connected between the secondary coil of the transformer and the discharge lamp and provided with a first pair of transistors and a second pair of transistors, capable of converting a DC voltage produced from the AC voltage that appears at the secondary coil of the transformer into an AC voltage whose polarity is changed at predetermined intervals, the first pair of transistors having withstand voltage characteristic superior to that of the second pair of transistors; a voltage measuring unit for measuring the DC voltage applied to the H-bridge circuit; and a control unit for turning on only the first pair of transistors when applying a high voltage to the discharge lamp to cause a discharge to pass through the gas contained in the discharge lamp, for estimating an on-state resistance of either the first or second pair of transistors which is to be turned on, and for performing an on/off control operation on the switching element according to the measured DC voltage and the estimated on-state resistance and for alternately turning on the first and second pairs of transistors to apply the AC voltage to the discharge lamp after the discharge lamp has been ignited so that a power supplied to the discharge lamp is stabilized.

In addition, the device can comprise a current measuring element for measuring a current flowing through the discharge lamp. The control unit can also predict an AC voltage actually applied to the discharge lamp from the measured current and DC voltage and the estimated on-state resistance to perform an on/off control operation on the switching element so that a predetermined power is supplied to the discharge lamp.

Preferably, the control unit includes a temperature measuring element for measuring an ambient temperature in the vicinity of the H-bridge circuit and a memory for storing a first on-state resistance table representing a one-to-one correspondence between ambient temperatures and on-state resistances for the first pair of transistors and a second on-state resistance table representing a one-to-one correspondence between ambient temperatures and on-state resistances for the second pair of transistors. The control unit can estimate the on-state resistance of either the first or second pair of transistors that is to be turned on by retrieving an on-state resistance corresponding to the measured ambient temperature from either the first or second on-state resistance table.

In accordance with another aspect of the present invention, there is provided an H-bridge circuit which can accept any one of two or more DC voltages having different values and change the polarity of a DC voltage applied thereto so as to generate an AC voltage, comprising: first and second pairs of switching elements, the first pair of switching elements having withstand voltage characteristic superior to that of the second pair of switching elements; and at least a control terminal for receiving a control signal for turning on only the first pair of switching elements when the H-bridge accepts a high DC voltage, and for receiving a control signal for turning on the first and second pairs of switching elements alternately when the H-bridge accepts a low DC voltage and converts the low DC voltage into an AC voltage. Preferably, the on-state resistances of the four switching elements of the first and second pairs are almost equal to each other so that the difference between the on-state resistances may be ignored.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
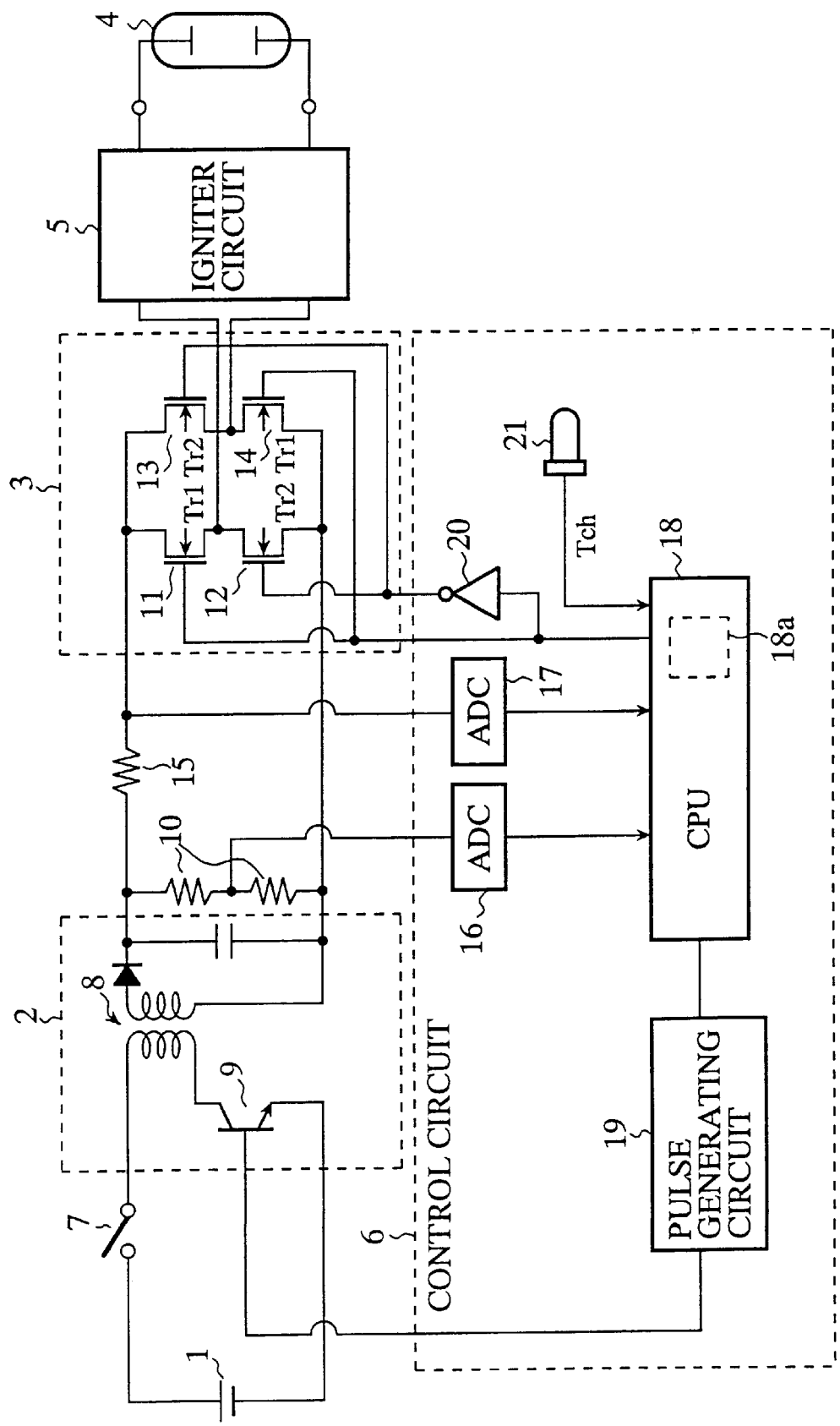
FIG. 1 is a block diagram of a discharge lamp lighting control device according to a first embodiment of the present invention.

Referring next to FIG. 1, there is illustrated a block diagram of a discharge lamp lighting control device according to a first embodiment of the present invention. In the figure, reference numeral 1 denotes a DC power supply, such as a battery, which can be mounted on an automobile, 2 denotes a DC/DC converter which converts the power supply voltage from the DC power supply 1 into a higher predetermined voltage, 3 denotes DC/AC inverter which converts the predetermined voltage from the DC/DC converter into an AC voltage, 4 denotes a discharge lamp, 5 denotes an igniter circuit connected between the DC/AC inverter 3 and the discharge lamp 4, for generating and applying an extra-high voltage to the discharge lamp by raising the high voltage from the DC/DC converter 2 when providing power to the discharge lamp, 6 denotes a control circuit for controlling the DC/DC converter 2 so that the discharge lamp lighting control device supplies a constant power to the discharge lamp 4, and 7 denotes a headlight lighting switch connected between the DC power supply 1 and the DC/DC converter 2. The DC/AC inverter 3 includes an H-bridge circuit constructed of a first pair of transistors 11 and 14 and a second pair of transistors 12 and 13 that can be controlled by the control circuit 6.

Furthermore, reference numeral 8 denotes a transformer having its primary coil electrically connected to the DC power supply 1 and its secondary coil electrically connected to the discharge lamp 4, for generating, at the secondary coil, a voltage which is higher than that applied to the primary coil, and 9 denotes a switching element connected, in series to the DC power supply 1, between the primary coil of the transformer 8 and the DC power supply 1. The control circuit 6 can perform an on/off control operation on the switching element 9. Resistors 10, which are disposed as a voltmeter, are connected to the secondary coil of the transformer 8 for measuring the DC voltage that appears at the secondary coil of the transformer 8 according to the state of the discharge lamp 4 and for furnishing it as a lamp voltage. The lamp voltage represents the state of the discharge lamp 4. Another resister 15 is also connected to the secondary coil for measuring a lamp current flowing from the secondary coil to the discharge lamp 4.

Reference numeral 16 denotes a first AD converter for converting the analog lamp voltage measured by the two resistors 10 into an equivalent digital voltage data, 17 denotes a second AD converter for converting the analog lamp current measured by the resistor 15 into an equivalent digital current data, 18 denotes a central processing unit or CPU for generating a switching control signal to control the switching operation of the switching element 9 according to the two digital data from the first and second A/D converters, 19 denotes a pulse generating circuit for generating pulses having a pulse repetition rate and a duty cycle dependent upon the level of the switching control signal from the CPU, 20 denotes an inverter for inverting a bridge control signal that is furnished to the first pair of transistors 11 and 14 by the CPU 18 and then delivering the inverted bridge control signal to the second pair of transistors 12 and 13, 21 denotes a temperature measuring element for measuring an ambient temperature in the vicinity of the H-bridge circuit, and 18a denotes a non-volatile memory disposed in the CPU 18, for storing an on-state resistance table representing the on-state resistance characteristic of the first through fourth transistors 11 to 14.

Figure 2:
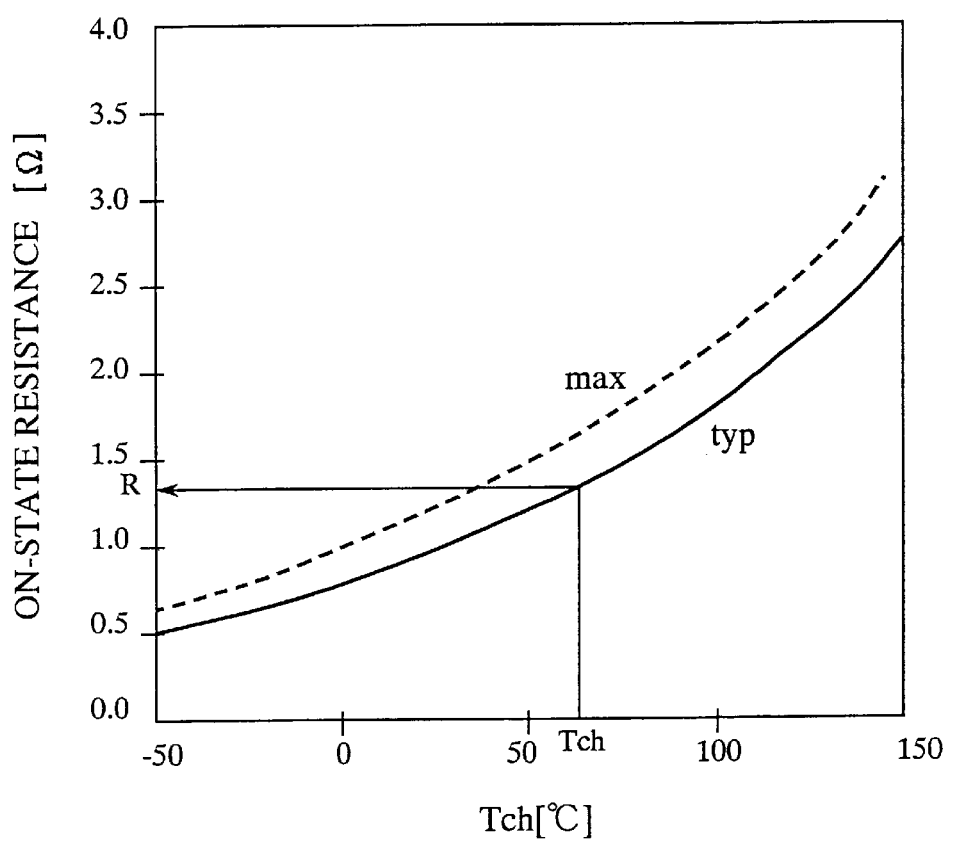
FIG. 2 is a graph showing an example of the on-state resistance characteristics of transistors, which is stored in a non-volatile memory of the discharge lamp lighting control device according to the first embodiment of the present invention.

Referring next to FIG. 2, there is illustrated a graph showing an example of the on-state resistance characteristic of the first through fourth transistors 11 to 14, which is stored in the non-volatile memory 18a. In the figure, the horizontal axis represents the temperature of the transistors, and the vertical axis represents the on-state resistance of the transistors. The solid curved line shows typical on-state resistance characteristic of transistors of the same type as the transistors 11 to 14. The dashed line shows maximum on-state resistance characteristics of transistors of the same type as the transistors 11 to 14. As shown in figure, there are variations in the on-state resistance characteristic of transistors even though their withstand voltages and types are specified. In the first embodiment, the first pair of transistors 11 and 14 can be of the same type with a withstand voltage of 400 Volts, and the second pair of and third transistors 12 and 13 can be of the same type with a withstand voltage of 100 Volts. Those transistors are selected from various types of transistors so that the difference between typical on-state resistances of the two different types of transistors is about hundreds of milliohms over a range of operating temperatures. The on-state resistances of the four transistors of the first and second pairs are equal to each other under the same temperature condition so that the difference between the on-state resistances may be ignored. Typical on-state resistance characteristic of any one of the first and second pairs of transistors is stored in the form of a table into the non-volatile memory 18a. As an alternative, the typical on-state resistance characteristic can be stored in another form.

Figure 3:
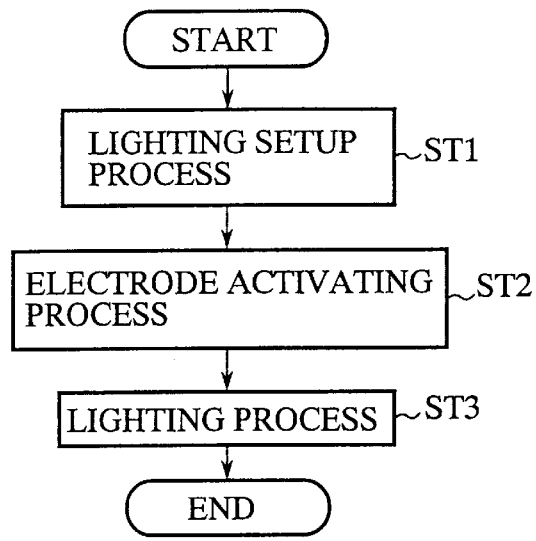
FIG. 3 is a flow diagram showing the lighting control operation of a CPU included in the discharge lamp lighting control device according to the first embodiment of the present invention.

Referring next to FIG. 3, there is illustrated a flow diagram showing the lighting control operation of the CPU 18 according to the first embodiment of the present invention. In the figure, reference string ST1 denotes a lighting setup process step of performing a control operation to produce an arc discharge within the discharge lamp 4 by applying an extra-high voltage of 20 kV to the discharge lamp 4, ST2 denotes an electrode activating process step of activating the electrodes of the discharge lamp 4 so as to facilitate the electrodes to emit ions, and ST3 denotes a lighting process step of making the discharge lamp continue to emit light through a current path formed by the arc discharge.

In the lighting setup process step ST1, the CPU 18 furnishes a predetermined switching control signal to the pulse generating circuit 19. In response to the switching control signal, the pulse generating circuit 19 generates a predetermined pulse signal. At that time, since no breakdown is produced in the discharge lamp 4, the electric circuit connected to both ends of the secondary coil of the transformer 8 is broken. As a result, the DC power voltage of 12 to 24 Volts is raised up to a predetermined voltage of about 400 Volts by the transformer 8. While the CPU 18 controls the DC/DC converter 2 so that the DC/DC converter 2 generates the predetermined high voltage, it determines whether the transformer 8 generates the predetermined voltage by monitoring the digital voltage data from the first A/D converter 16. The CPU 18 also furnishes a bridge control signal for turning on the first pair of transistors 11 and 14 of the H-bridge circuit during the interval that the step ST1 is performed.

After the lighting setup process step ST1 is started, the igniter circuit 5 runs from the high voltage of 400 Volts from the transformer 8 initially. The igniter circuit 5 raises the high voltage up to an extra-high voltage of 20 kV and then supplies it to the discharge lamp 4 that has remained in an electrically insulated state. When the extra-high voltage of 20 kV is applied across the two electrodes of the discharge lamp 4 that are insulated from each other, the insulation between the electrodes which has been provided by a gas contained within the discharge tube is broken and ions start moving between the two electrodes. The movement of ions and the gas cause the discharge lamp 4 to start emitting light. The breakdown results in that the discharge lamp 4 has a load resistance to allow a current with a predetermined amount to flow through the discharge lamp 4 and the igniter circuit 5 stops its igniting operation. A voltage generated by the discharge lamp 4 in which the breakdown has been caused appears at the secondary coil of the transformer 8.

In the electrode activating process step ST2, after a relatively long time has elapsed since the discharge lamp 4 was ignited, the CPU 18 changes the state of the bridge control signal so as to turn on the second pair of transistors 12 and 13 and turn off the other pair of transistors. The CPU 18 then maintains that state in which the second pair of transistors 12 and 13 is turned on for a relatively long period of time. As a result, the electrodes of the discharge lamp are activated and the discharge lamp 4 is therefore brought into a state in which ions are easily generated.

In the lighting process step ST3, the CPU 18 changes the level of the switching control signal to control the current flowing through the discharge lamp 4 so that a given rated power is supplied to the discharge lamp 4. The CPU 18 further changes the logic level of the bridge control signal at predetermined intervals so as to turn on the first pair of the first and fourth transistors and the second pair of the second and third transistors alternately. As a result, the predetermined constant power continues to be supplied to the discharge lamp 4. The discharge lamp 4 can thus continue to emit light with stability for an extended period of time. The lighting process step ST3 continues being performed until the headlight lighting switch 7 is turned off.

Next, a detailed description will be made as to the operation of the CPU 18 which can control the DC/DC converter 2 according to the measured lamp voltage in the lighting process step ST3. The CPU 18 refers to the on-state resistance table stored in the non-volatile memory 18a and then estimates the on-state resistance R of the four transistors 11 to 14 that make up the H-bridge by retrieving an on-state resistance value, which corresponds to the ambient temperature measured by the temperature measuring element 21, from the table. The CPU 18 then predicts a voltage VS that is actually applied to the discharge lamp 4 by using the following equation (1) from the on-state resistance R, the digital voltage data VL from the first A/D converter 16, and the digital current data IL from the second A/D converter 17:

$$VS = VL - 2 \times (R \times IL) \tag{1}$$

Figure 4:
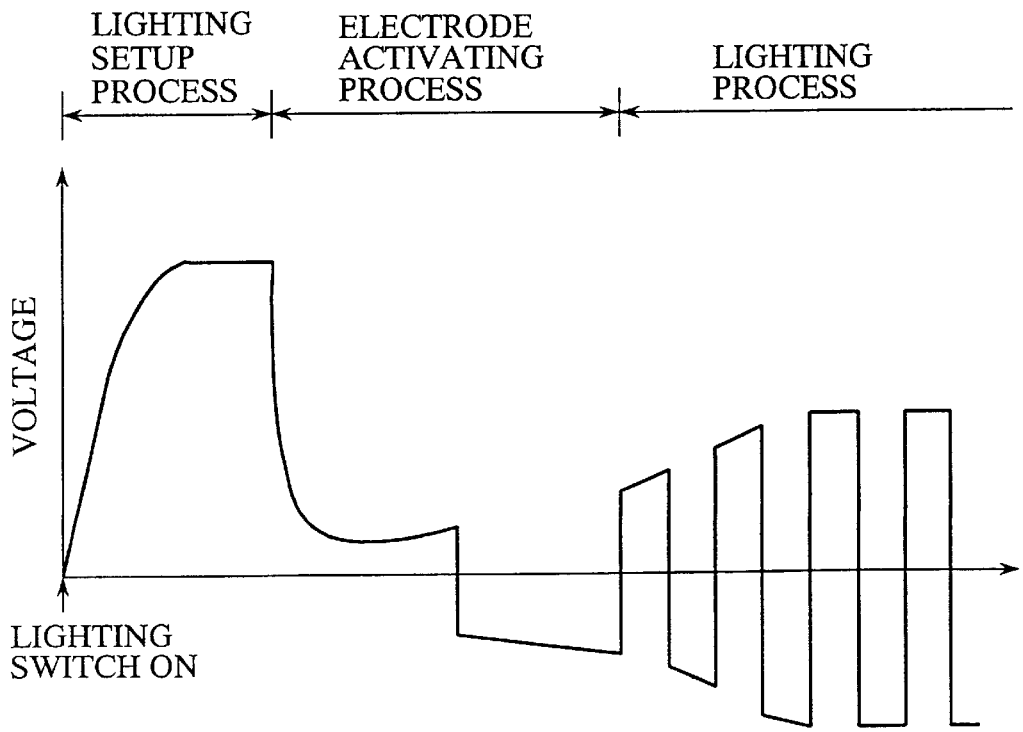
FIG. 4 is a diagram showing an example of the waveform of a voltage applied to the discharge lamp during a sequence of lighting control process steps.
Figure 5:
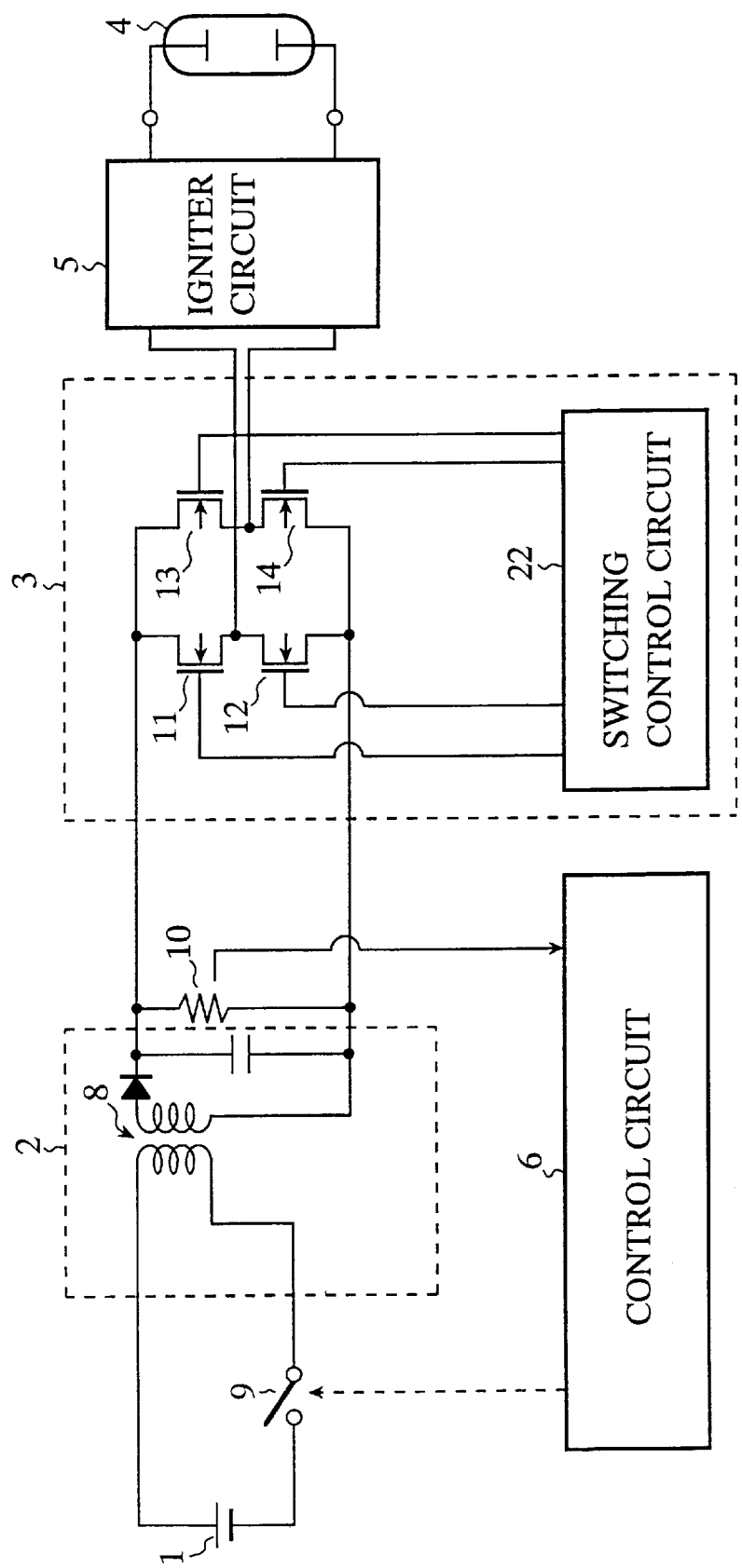
FIG. 5 is a block diagram showing a prior art discharge lamp lighting control device.

The CPU 18 then changes the level of the switching control signal furnished to the pulse generating circuit 9 according to the predicted voltage VS and the digital current data IL so that the crest value of the AC voltage furnished by the DC/AC inverter 3 remains constant and hence the actual power supplied to the discharge lamp 4 becomes equal to the given rated power. As a result, the discharge lamp 4 can emit light with stability. Referring next to FIG. 4, there is illustrated an example of the waveform of the voltage applied to the discharge lamp 4 in the aforementioned sequence of lighting control processes ST1 to ST3. As shown in FIG. 4, an extra-high voltage of 20 kV is applied to the discharge lamp in the lighting setup process. In the electrode activating process, a relatively low voltage that is caused by the discharge lamp 4 appears across the electrodes for a relatively long period of time, as shown in the figure. After that, an AC voltage with a rated value, which is generated by the H-bridge circuit, is applied across the two electrodes of the discharge lamp 4 in the lighting process. The reason why such an AC voltage is supplied to the discharge lamp 4 in the lighting process is that the power supply of a DC voltage to the discharge lamp 4 activates only one of the two electrodes and therefore the amount of ions emitted out of the activated electrode decreases in a relatively short time.

As previously explained, the H-bridge circuit according to the first embodiment of the present invention consists of the first pair of transistors 11 and 14 and the second pair of transistors 12 and 13, the withstand voltage characteristic of the first pair of transistors 11 and 14 being superior to that of the second pair of transistors 12 and 13. Besides the CPU 18 enables the first pair of transistors 11 and 14 to turn on when pumping a gas within the discharge lamp so as to cause an arc discharge to pass through the gas. Accordingly, the discharge lamp lighting control device of the first embodiment can apply a high voltage having a predetermined value to the discharge lamp by way of the first pair of transistors 11 and 14 with the high withstand voltage characteristic of 400 Volts.

In addition, the use of the first and second pairs of transistors 11 to 14 with different withstand voltage characteristics in the H-bridge circuit offers another advantage of being able to reduce the physical size of the H-bridge circuit. This is because it is possible to reduce the space occupied by the second pair of transistors 12 and 13 with the low withstand voltage characteristic of 100 Volts which are turned off when pumping a gas within the discharge lamp so as to cause an arc discharge to pass through the gas.

Furthermore, since the control circuit 6 estimates the on-state resistance R which corresponds to the measured ambient temperature in the vicinity of the H-bridge circuit, and then predicts the voltage VS actually applied to the discharge lamp 4 and performs an on/off control operation on the switching element 9 according to the predicted voltage VS and the digital current data so as to stabilize the power provided to the discharge lamp 4, the discharge lamp lighting control device of the first embodiment can enable the discharge lamp 4 to emit light with stability regardless of forming the H-bridge circuit using the four transistors with different withstand voltage characteristics.

Second Embodiment

A discharge lamp lighting control device according to a second embodiment of the present invention has a DC/AC inverter 3 including an H-bridge circuit which consists of a first pair of transistors 11 and 14 of the same type with a withstand voltage of 400 Volts and a second pair of transistors 12 and 13 of the same type with a withstand voltage of 100 Volts, like the discharge lamp lighting control device according to the first embodiment of the present invention. The H-bridge of the second embodiment, however, differs from that of the first embodiment in that there is a difference between the typical on-state resistances of the two pairs of transistors, which cannot be neglected. In order to predict the AC voltage VS actually applied to the discharge lamp 4 precisely, the CPU 18 of the second embodiment includes a non-volatile memory 18a including a first on-state resistance table representing the on-state resistance characteristic of the first pair of transistors 11 and 14 and a second on-state resistance table representing the on-state resistance characteristic of the second pair of transistors 12 and 13, and refers to either the first on-state resistance table or the second on-state resistance table according to the logic level of the bridge control signal when estimating the AC voltage VS actually applied to the discharge lamp. The other structure of the second embodiment is the same as that of the first embodiment.

The CPU 18 switches between the first and second on-state resistance tables in such a manner that it retrieves an on-state resistance value R1 corresponding to the ambient temperature measured from the first on-state resistance table when turning on the first pair of transistors 11 and 14, and retrieves an on-state resistance value R2 corresponding to the ambient temperature measured from the second on-state resistance table when turning on the second pair of transistors 12 and 13. The CPU 18 predicts the AC voltage VS actually applied to the discharge lamp using the following equation (2):

$$VS = VL - 2 \times (R1 \times IL) \quad (2)$$

when the bridge control signal is at a LOW logic level $$VS = VL - 2 \times (R2 \times IL)$$

when the bridge control signal is at a HIGH logic level Like the first embodiment, the CPU 18 then changes the level of the switching control signal furnished to the pulse generating circuit 9 according to the predicted voltage VS and the digital current data IL so that the crest value of the AC voltage furnished by the DC/AC inverter 3 remains constant and hence the actual power supplied to the discharge lamp 4 becomes equal to the given rated power. As a result, the discharge lamp 4 emits light with stability.

Like the H-bridge circuit of the first embodiment, the H-bridge circuit according to the second embodiment of the present invention consists of the first pair of transistors 11 and 14 and the second pair of transistors 12 and 13, the withstand voltage characteristic of the first pair of transistors 11 and 14 being superior to that of the second pair of transistors 12 and 13. Besides the CPU 18 enables the first pair of transistors 11 and 14 to turn on when pumping a gas within the discharge lamp so as to cause an arc discharge to pass through the gas. Accordingly, the discharge lamp lighting control device of the second embodiment can apply a high voltage having a predetermined value to the discharge lamp by way of the first pair of transistors 11 and 14 with the high withstand voltage characteristic of 400 Volts.

In addition, the use of the first and second pairs of transistors 11 to 14 with different withstand voltage characteristics in the H-bridge circuit offers another advantage of being able to reduce the physical size of the H-bridge circuit. This is because it is possible to reduce the space occupied by the second pair of transistors 12 and 13 with the low withstand voltage characteristic of 100 Volts which are turned off when pumping a gas within the discharge lamp so as to cause an arc discharge to pass through the gas.

Furthermore, since the control circuit 6 estimates the on-state resistance R of either the first or second pair of transistors to be turned on, which corresponds to the measured ambient temperature in the vicinity of the H-bridge circuit, and then predicts the voltage VS actually applied to the discharge lamp 4 and performs an on/off control operation on the switching element 9 according to the predicted voltage VS and the digital current data so as to stabilize the power provided to the discharge lamp 4, the discharge lamp lighting control device of the second embodiment can enable the discharge lamp 4 to emit light with stability regardless of forming the H-bridge circuit using the four transistors with different withstand voltage characteristics.

The above descriptions are directed to the examples in which the H-bridge circuit of the present invention is incorporated into the discharge lamp lighting control device. The H-bridge circuit according to the present invention can also be applied to equipment such as a device for driving an AC motor into which an AC/DC inverter that accepts two or more DC voltages having different values and converts a DC voltage into an AC voltage is incorporated.

Many widely different embodiments of the present invention may be constructed without departing from the spirit and scope of the present invention. It should be understood that the present invention is not limited to the specific embodiments described in the specification, except as defined in the appended claims.

What is claimed is:

1. A discharge lamp lighting control device for applying a high voltage to a discharge lamp to cause a discharge to pass through a gas contained in said discharge lamp and for applying an AC voltage to said discharge lamp so as to control the lighting of said discharge lamp, said device comprising:

a transformer having a primary coil electrically connected to a DC power supply and a secondary coil electrically connected to said discharge lamp, for generating an AC voltage at said secondary coil thereof which is higher than a DC voltage applied to said primary coil thereof;

a switching element connected, in series to said DC power supply, between said primary coil of said transformer and said DC power supply;

an H-bridge circuit connected between said secondary coil of said transformer and said discharge lamp and provided with a first pair of transistors and a second pair of transistors, capable of converting a DC voltage produced from said AC voltage that appears at said secondary coil of said transformer into an AC voltage whose polarity is changed at predetermined intervals, said first pair of transistors having withstand voltage characteristic superior to that of said second pair of transistors, and the on-state resistances of the four transistors of said first and second pairs being equal to each other so that the difference between the on-state resistances may be ignored;

voltage measuring means for measuring the DC voltage applied to said H-bridge circuit; and control means for turning on only said first pair of transistors when applying a high voltage to said discharge lamp to cause a discharge to pass through the gas contained in said discharge lamp, and for performing an on/off control operation on said switching element according to the measured DC voltage and alternately turning on said first and second pairs of transistors to apply the AC voltage from said H-bridge circuit to said discharge lamp after said discharge lamp has been ignited so that a power supplied to said discharge lamp is stabilized.

2. The device according to claim 1, further comprising current measuring means for measuring a current flowing through said discharge lamp, wherein said control means estimates an on-state resistance of said first and second pair of transistors and also predicts an AC voltage actually applied to said discharge lamp from said measured current and DC voltage and said estimated on-state resistance to perform an on/off control operation on said switching element so that a predetermined power is supplied to said discharge lamp.

3. The device according to claim 2, wherein said control means includes means for measuring an ambient temperature in the vicinity of said H-bridge circuit and means for storing an on-state resistance table representing a one-to-one correspondence between ambient temperatures and on-state resistances for said first and second pairs of transistors, and wherein said control means estimates the on-state resistance of said first and second pair of transistors by retrieving an on-state resistance corresponding to the measured ambient temperature from said on-state resistance table.

4. A discharge lamp lighting control device for applying a high voltage to a discharge lamp to cause a discharge to pass through a gas contained in said discharge lamp and for applying an AC voltage to said discharge lamp so as to make said discharge lamp emit light, said device comprising:

a transformer having a primary coil connected to a DC power supply and a secondary coil electrically connected to said discharge lamp, for generating an AC voltage at said secondary coil thereof which is higher than a DC voltage applied to said primary coil thereof;

a switching element connected, in series to said DC power supply, between said primary coil of said transformer and said DC power supply;

an H-bridge circuit connected between said secondary coil of said transformer and said discharge lamp and provided with a first pair of transistors and a second pair of transistors, capable of converting a DC voltage produced from said AC voltage that appears at said secondary coil of said transformer into an AC voltage whose polarity is changed at predetermined intervals, said first pair of transistors having withstand voltage characteristic superior to that of said second pair of transistors;

voltage measuring means for measuring the DC voltage applied to said H-bridge circuit; and control means for turning on only said first pair of transistors when applying a high voltage to said discharge lamp to cause a discharge to pass through the gas contained in said discharge lamp, for estimating an on-state resistance of either said first or second pair of transistors which is to be turned on, and for performing an on/off control operation on said switching element according to the measured DC voltage and said estimated on-state resistance and for alternately turning on said first and second pairs of transistors to apply the AC voltage from said H-bridge circuit to said discharge lamp after said discharge lamp has been ignited so that a power supplied to said discharge lamp is stabilized.

5. The device according to claim 4, further comprising current measuring means for measuring a current flowing through said discharge lamp, wherein said control means also predicts an AC voltage actually applied to said discharge lamp from said measured current and DC voltage and said estimated on-state resistance to perform an on/off control operation on said switching element so that a predetermined power is supplied to said discharge lamp.

6. The device according to claim 5, wherein said control means includes means for measuring an ambient temperature in the vicinity of said H-bridge circuit and means for storing a first on-state resistance table representing a one-to-one correspondence between ambient temperatures and on-state resistances for said first pair of transistors and a second on-state resistance table representing a one-to-one correspondence between ambient temperatures and on-state resistances for said second pair of transistors, and wherein said control means estimates the on-state resistance of either said first or second pair of transistors which is to be turned on by retrieving an on-state resistance corresponding to the measured ambient temperature from either said first or second on-state resistance table.

7. An H-bridge circuit which can accept any one of two or more DC voltages having difference values and change the polarity of a DC voltage applied thereto so as to generate an AC voltage, comprising:

first and second pairs of switching elements, said first pair of switching elements having withstand voltage characteristic superior to that of said second pair of switching elements; and at least a control terminal for receiving a control signal for turning on only said first pair of switching elements when said H-bridge accepts a high DC voltage, and for receiving a control signal for turning on said first and second pairs of switching elements alternately when said H-bridge accepts a low DC voltage and converts the low DC voltage into an AC voltage.

8. The H-bridge circuit according to claim 7, wherein the on-state resistances of the four switching elements of said first and second pairs are equal to each other so that the difference between the on-state resistances may be ignored.

* * * * *